US009580341B1

(12) United States Patent
Brown et al.

(10) Patent No.: US 9,580,341 B1
(45) Date of Patent: Feb. 28, 2017

(54) BIOLOGICAL TWO-STAGE CONTAMINATED WATER TREATMENT SYSTEM AND PROCESS

(71) Applicants: Jess C. Brown, San Clemente, CA (US); Christopher T. Cleveland, Sacramento, CA (US)

(72) Inventors: Jess C. Brown, San Clemente, CA (US); Christopher T. Cleveland, Sacramento, CA (US)

(73) Assignee: Biotta LLC, Phoenix, AZ (US)

( * ) Notice: Subject to any disclaimer, the term of this patent is extended or adjusted under 35 U.S.C. 154(b) by 0 days.

(21) Appl. No.: 14/196,584

(22) Filed: Mar. 4, 2014

Related U.S. Application Data

(63) Continuation-in-part of application No. 13/573,533, filed on Sep. 22, 2012.

(51) Int. Cl.
*C02F 3/30* (2006.01)
*C02F 3/00* (2006.01)
(Continued)

(52) U.S. Cl.
CPC ............ *C02F 3/006* (2013.01); *C02F 1/5209* (2013.01); *C02F 3/30* (2013.01); *C02F 9/00* (2013.01);
(Continued)

(58) Field of Classification Search
CPC .......... C02F 3/006; C02F 3/30; C02F 1/5209; C02F 9/00; C02F 2209/005;
(Continued)

(56) References Cited

U.S. PATENT DOCUMENTS 3,425,936 A   2/1969  Culp et al.
4,053,396 A   10/1977 Trense et al.
(Continued)

FOREIGN PATENT DOCUMENTS

| CN | 101891356 A | 11/2010 |
| DE | 3902626 A1 | 8/1990 |
| WO | 0174471 A1 | 10/2001 |

OTHER PUBLICATIONS

Bonnelye, et al., Biodenitrification: More than 20 years of experience at full scale, AWWA Inorganic Contaminants Workshop, 2006, Austin, TX.
(Continued)

*Primary Examiner* — Fred Prince
(74) *Attorney, Agent, or Firm* — The Webb Law Firm

(57) ABSTRACT

The systems and methods may be used for treatment of water that contains contaminants. Water containing at least one of a nitrate, percholate, chromate, selenite, and a volatile organic chemical is combined with nutrients and then is processed in an anoxic-anaerobic bioreactor. The combined effluent may also be oxygenated by dosing with hydrogen peroxide or liquid oxygen. The combined effluent of the bioreactor is dosed with a particle conditioning agent. The combined effluent treated water of the bioreactor is then filtered in a biofilter to produce a treated effluent stream. The influent water and combined effluent of the anoxic-anaerobic bioreactor may also be dosed with hydrogen peroxide to control biomass content in the system.

17 Claims, 2 Drawing Sheets

(51) Int. Cl.
*C02F 9/00* (2006.01)
*C02F 1/52* (2006.01)

(52) U.S. Cl.
CPC .. *C02F 2209/005* (2013.01); *C02F 2209/008* (2013.01); *C02F 2209/29* (2013.01)

(58) Field of Classification Search
CPC ............ C02F 2209/008; C02F 2209/16; C02F 2209/22; C02F 2209/29; C02F 2209/11
USPC ....... 210/605, 614, 615, 616, 617, 618, 631, 210/903, 906, 150, 151, 252, 259
See application file for complete search history.

(56) References Cited

U.S. PATENT DOCUMENTS

| | | | |
|---|---|---|---|
| 4,255,266 A | | 3/1981 | Moreaud et al. |
| 4,919,815 A | * | 4/1990 | Copa et al. ................... 210/603 |
| 5,372,720 A | | 12/1994 | Jonsson |
| 5,736,047 A | | 4/1998 | Ngo |
| 6,261,456 B1 | | 7/2001 | Yamasaki et al. |
| 6,923,596 B2 | | 8/2005 | Lessard |
| 7,682,815 B2 | | 3/2010 | Guiot et al. |
| 2002/0139747 A1 | | 10/2002 | Gantzer |
| 2003/0047521 A1 | | 3/2003 | McGinness |
| 2005/0045557 A1 | | 3/2005 | Daigger et al. |
| 2005/0067356 A1 | | 3/2005 | Bowman et al. |
| 2006/0060512 A1 | * | 3/2006 | Astle et al. ..................... 210/85 |
| 2006/0124543 A1 | * | 6/2006 | Pehrson et al. ............... 210/614 |
| 2006/0292684 A1 | | 12/2006 | Bentley et al. |
| 2007/0102354 A1 | | 5/2007 | Flournoy et al. |
| 2007/0114174 A1 | | 5/2007 | Peeters et al. |
| 2007/0193950 A1 | | 8/2007 | Brown et al. |
| 2008/0110828 A1 | | 5/2008 | Yerushalmi et al. |
| 2009/0200231 A1 | | 8/2009 | Walton et al. |
| 2009/0218280 A1 | * | 9/2009 | Josse .............................. 210/605 |
| 2009/0283471 A1 | | 11/2009 | Tanaka et al. |
| 2010/0044306 A1 | | 2/2010 | Lo et al. |
| 2010/0089825 A1 | * | 4/2010 | Canzano et al. ............... 210/610 |
| 2010/0120104 A1 | | 5/2010 | Reed |
| 2010/0282654 A1 | | 11/2010 | Hauschild |
| 2011/0017663 A1 | * | 1/2011 | Raskin et al. ................. 210/617 |

OTHER PUBLICATIONS

Fathepure, et al., Complete Degradation of Polychlorinated Hydrocarbons by a Two-Stage Biofilm Reactor, Applied and Environmental Microbiology, Dec. 1991, pp. 3418-3422, vol. 57, No. 12.

Naidoo et al., "Treated Wastewater Effluent as a Source of Microbial Pollution of Surface Water Resources", Int. J. Environ. Res. Public Health 2014, 11(1), pp. 249-270.

\* cited by examiner

US 9,580,341 B1

BIOLOGICAL TWO-STAGE CONTAMINATED WATER TREATMENT SYSTEM AND PROCESS

CROSS REFERENCE TO RELATED APPLICATION

This application claims priority as a continuation-in-part of U.S. patent application Ser. No. 13/573,533, filed on Sep. 22, 2012, the entire contents of which are herein incorporated by reference.

BACKGROUND OF THE INVENTION

Field of the Invention

This invention relates to processes and systems for treatment of groundwater or surface water that contains at least one of the following contaminants: nitrate, perchlorate, chromate, selenate, and volatile organic chemicals such as perchloroethylene, trichloroethylene, dichloroethylene, vinyl chloride, trichloropropanol, dibromochloropropane, and carbon tetrachloride. The new method implements a second treatment stage aerobic biofilter in combination with a first stage anoxic/anaerobic bioreactor with interstage oxygenation and particle conditioning addition.

Description of the Related Art

Raw drinking water sources may contain nitrate, perchlorate, chromate, selenate, and one or more of various volatile organic chemicals, for example, perchloroethylene, trichloroethylene, dichloroethlyene, vinyl chloride, trichloropropane, dibromochloropropane and carbon tetrachloride. There are numerous processes and technologies available for removing one or more of these contaminants from drinking water, including ion exchange, reverse osmosis, electrodialysis reversal, granular activated carbon adsorption, air stripping, and advanced oxidation. Each of these processes and technologies has one or more of the following disadvantages: exerts a high energy demand, exerts a high operational cost, generates of a high-strength concentrated waste stream that must be further treated or disposed, adds considerable salt to a given watershed, does not address all of the cited contaminants, is sensitive to raw water quality, and sensitive to operating conditions.

Various biological processes have also been tested and used to treat one or more of the cited contaminants. These processes are typically single stage biological reactors with upstream nutrient addition. These processes have one or more of the following disadvantages in that they: cannot treat all of the cited contaminants, produce excess biomass that can slough into the effluent of the bioreactor, can experience clogging due to the production of excessive extracellular polymeric substances, and can leak nutrients into the effluent, thereby causing biological regrowth potential and disinfection by-product formation potential.

Some processes may include an additional element with a particulate filter unit that may be sand, granular activated carbon, anthracite or similar media and may have a backwash system to reduce clogging and to fluidize the bioreactor bed. However, the filtration in these systems is for high rate particle filtration rather than for degrading and removing dissolved contaminants.

SUMMARY OF THE INVENTION

In one preferred and non-limiting embodiment, provided are processes and systems for treatment of water that contains contaminants. Water containing at least one of a nitrate, percholate, chromate, selenate and a volatile organic chemical is combined with nutrients and then is processed in an anoxic-anaerobic bioreactor. The combined effluent of the bioreactor is dosed with a particle conditioning agent. The combined effluent may also be oxygenated by dosing with hydrogen peroxide or liquid oxygen. The combined effluent treated water of the bioreactor is then filtered in a biofilter to produce a treated effluent stream. The influent water and combined effluent of the anoxic-anaerobic bioreactor may also be dosed with hydrogen peroxide to control biomass content in the system.

In another preferred and non-limiting embodiment, provided is a method for treatment of water that contains contaminants including: dosing an influent water stream containing at least one of a nitrate, perchlorate, chromate, selenite, and a volatile organic chemical with a dosing amount of one or more nutrients; processing the combined influent water stream in an anoxic-anaerobic bioreactor; dosing an effluent treated water stream of the anoxic-anaerobic bioreactor with a dosing amount of a particle conditioning agent; oxygenating the effluent treated water stream of the anoxic-anaerobic bioreactor; and filtering the combined effluent treated water in an aerobic biofilter to produce a treated effluent stream, wherein the dosing amount of the of one or more nutrients and the dosing amount of the particle conditioning agent are periodically adjusted by a program logic controller.

In a further preferred and non-limiting embodiment, provided is a system for treatment of water that contains contaminants including: an anoxic-anaerobic bioreactor in fluid communication with an influent water source containing at least one of a nitrate, perchlorate, chromate, selenite, and a volatile organic chemical; a nutrient dosing unit in fluid communication with said influent water source, wherein said nutrient dosing unit is controlled by a program logic controller; a particle conditioning dosing unit in fluid communication with an effluent treated water conduit connected between said anoxic-anaerobic bioreactor and an aerobic biofilter, wherein said particle conditioning dosing unit is controlled by said program logic controller; a treated effluent output of said aerobic biofilter; a plurality of in-line sensors positioned to collect data related to the influent water source, effluent treated water, and treated effluent, the sensors in electronic communication with the program logic controller, wherein the program logic controller is programmed to control the nutrient dosing unit and particle conditioning dosing unit based at least partially upon data received from the in-line sensors.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE PREFERRED EMBODIMENTS

Figure 1:
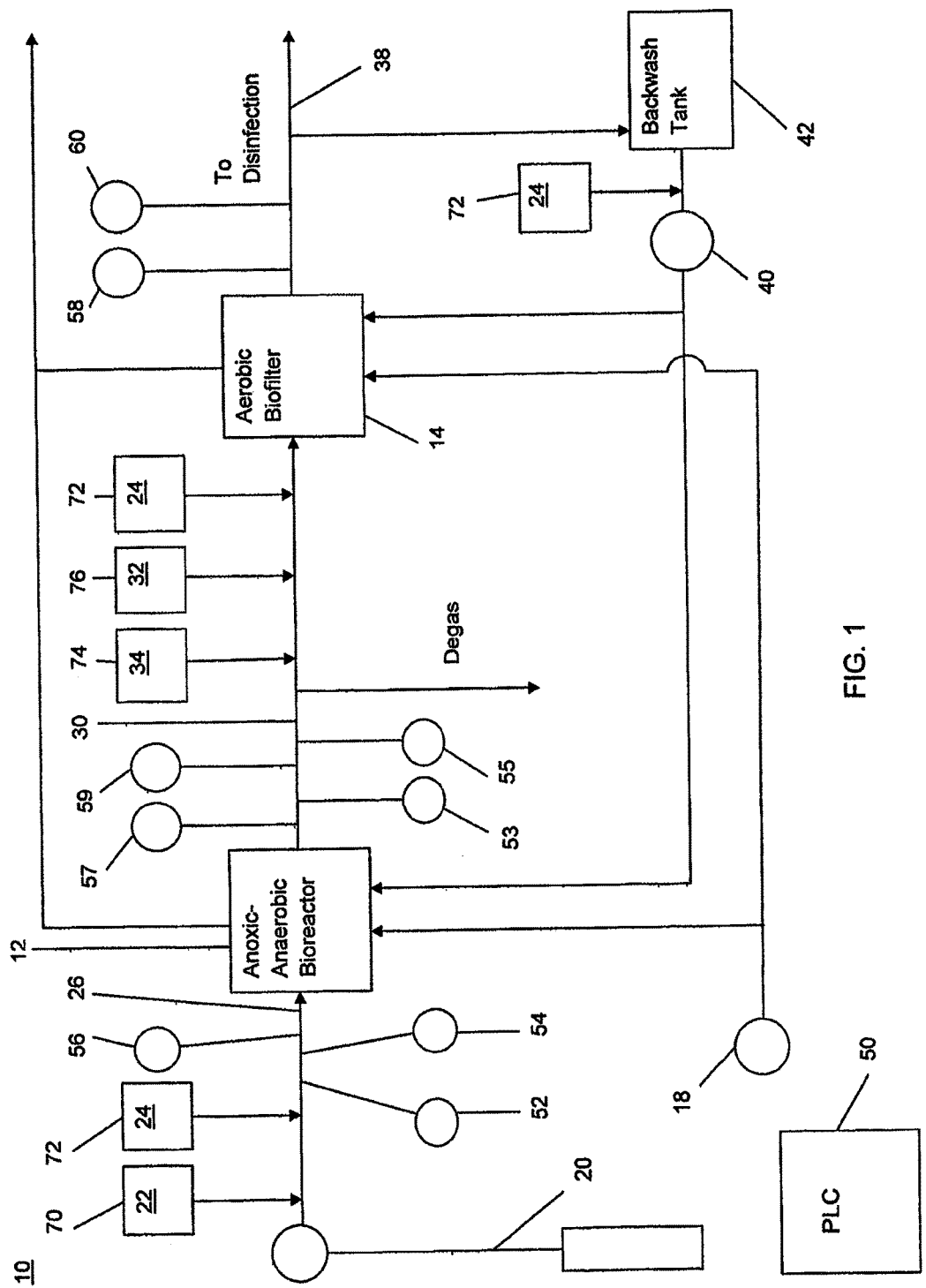
FIG. 1 is a schematic flow diagram of one embodiment of a biological two-stage contaminated water treatment system and process according to the principles of the present invention.

The following detailed description represents the best currently contemplated modes for carrying out the invention. The description is not to be taken in a limiting sense, but is made merely for the purpose of illustrating the general principles of the invention. For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Referring to FIG. 1, a biological treatment system 10 for removing one or more contaminants from groundwater or surface water has a first stage bioreactor 12 and a second stage biofilter 14. The bioreactor 12 may be an anoxic-anaerobic bioreactor that receives influent raw drinking water 20 with nutrients 22 added. The nutrients 22 may include acetic acid, ethanol, and glycerin as carbon source/electron donors, phosphorus in the form of phosphoric acid, and nitrogen in the form of ammonia may serve to achieve microbial degradation of water contaminants that may include nitrate, perchlorate, chromate, selenate, perchloroethylene, trichloroethylene, trichloropropane, carbon tetrachloride, dibromochloropropane and other volatile organic chemicals. Bacteria across the bioreactor can reduce dissolved oxygen, nitrate, and perchlorate to water, nitrogen gas, and chloride, respectively. Acetic acid is oxidized to carbon dioxide. The dosing of the influent water with hydrogen peroxide 24 may limit biological clogging of the system 10. As explained below, dosing of the nutrients 22 can be controlled and regulated by a program logic control system 50 which periodically and/or continuously receives measurements from a variety of in-line sensors positioned throughout the system 10.

The bioreactor 12 may be a suspended growth reactor, granular fixed-film reactor that is fixed-bed or fluidized bed, or membrane-based fixed-film reactors. The anoxic-anaerobic bioreactor 12 may degrade/remove nitrate, perchlorate, chromate, selenate, perchloroethylene, trichloroethylene, dichloroethylene, vinyl chloride, trichloropropanol, carbon tetrachloride, and other volatile organic chemicals. In some non-limiting embodiments, the bioreactor 12 may be a steel pressure vessel containing granular activated carbon (GAC). The pressure vessel can have various dimensions, and the GAC can be colonized by organisms indigenous to the raw water. In one non-limiting embodiments, the bioreactor contains approximately five feet of GAC.

After the dosed water influent stream 26 is treated across the bioreactor 12 the effluent treated water 30 may be dosed with oxygen 32 and dosed with a particle conditioning agent 34 in the interstage flow between the bioreactor 12 and the aerobic biofilter 14. The oxygenation 32 may be accomplished by dosing with hydrogen peroxide 24, liquid oxygen, by an aeration process such as fine-bubble diffusion or cascade aeration, or by an education process. The particle conditioning agent 34 dosing may be by use of a coagulant such as alum or ferric, or by use of a polymeric compound such as cationic polymer. The dosage of hydrogen peroxide 24 may be approximately 1 to 2 mg/L for biomass control and approximately 10 to 12 mg/L for oxygenation. Dosing with cationic polymer can improve filterability of the sloughed cells and hydrogen peroxide can reoxygenate the water and provide some oxidizing power to eliminate acetic acid or hydrogen sulfide if either of these compounds remains. Dosing can vary depending on the performance of the system 10. Program logic control system 50 can be used to control dosing of oxygen 32 and/or particle conditioning agent 34 based on information about system performance gathered using in-line sensors located throughout the system 10. A de-gas stage may be included upstream of the dosing of the particle conditioning agent 34 and oxygen 32 if nitrogen gas bubbles cause hydraulic or turbidity challenges in the biofilter 14. De-gassing could be achieved by using an open basin, open channel cascading flow, or a mechanical gas separator. If head is broken for the de-gas step, an interstage pump can be added.

The effluent treated water 30 with added dosing in the interstage flow that may increase the oxidation-reduction potential of the water, release trapped nitrogen gas bubbles as necessary, and condition sloughed biomass is then processed in the aerobic biofilter 14. The aerobic biofilter 14 may be a granular media-based biofilter or a biologically active membrane filter. The aerobic biofilter 14 may degrade/remove remaining volatile organic chemicals, hydrogen sulfide, residual carbon nutrient (including residual acetic acid), and sloughed biomass. The aerobic biofilter 14 may be a steel pressure vessel.

The system 10 control of biomass conditions in the anoxic-anaerobic bioreactor 12 and the aerobic biofilter 14 are important to the efficiency of removing the contaminants in the influent water 20 and in the effluent treated water 30. The contaminants in the influent water 20, the nutrients 22 from nutrient dosing, and the constituents in the resulting effluent treated water 30 are further treated in the aerobic biofilter 14. The biomass conditions at each stage 12, 14 may be monitored for turbidity and pressure loss to measure slime, sloughing, clogging and the like conditions. The dosing of influent water 20 and effluent treated water 30 with hydrogen peroxide 24 serves to chemically scour biomass and unclog the bioreactor 12 and biofilter 14, and the conduit or piping for conducting fluids in the system 10. The hydrogen peroxide 24 may be dosed intermittently or continuously as controlled by a program logic control system 50. There may also be a backwash pump 40 and backwash tank 42 to control or minimize biomass in the system 10 to reduce biological clogging of the bioreactor 12 and biofilter 14. Backwashes can be initiated automatically based on time and can include an air scour step, a combined air scour/fluidization step, and a final fluidization step.

The two-stage system 10 with a wide range in oxidation-reduction potential allows enhanced processing of the range of contaminants that can be degraded and removed. The destruction of multiple contaminants may be accomplished with reduced energy input and without producing high-volume, high-strength waste streams. The contaminant removal performance has been demonstrated in analysis to be typically independent of raw water quality. The treated effluent stream 38 of the system 10 also has minimal biomass. However, the treated effluent stream 38 can be dosed with a disinfection agent, such as chlorine, to meet a target residual level prior to storage and/or distribution. Disinfection agent dosing preferably occurs at a point downstream of the backwash draw to avoid circulating disinfection agent to the bioreactor 12 and/or biofilter 14 as part of the backwash process.

Run times for the bioreactor 12 and biofilter 14 can vary, but are typically about 24 and 48 hours, respectively. These values can be adjusted up or down based on start-up performance. The bioreactor 12 and/or biofilter 14 are expected to be offline for approximately 30 minutes during a backwash procedure. Redundancy in system 10 components (such as the use of multiple bioreactors and/or biofilters) can be considered to maintain continuous service during backwash and maintenance periods as necessary.

In-line sensors and other analytical equipment may be positioned throughout the system 10 to monitor system performance and gather data that can be used to control dosing and other operations. For example, flow rates can be monitored throughout the system 10, including the flow rates of the influent raw drinking water 20, influent stream 26, effluent treated water 30, and treated effluent stream 38. The headloss across the bioreactor 12 and biofilter 14 can also be determined by measuring and comparing pressure data from either side of the bioreactor 12 and biofilter 14. Run time can also be monitored. Dissolved oxygen concentration, nitrate concentration, perchlorate concentration, turbidity, and chlorine concentration at various points can also be measured. For example, the dissolved oxygen concentration, nitrate concentration, perchlorate concentration, turbidity, and chlorine concentration in the influent raw drinking water 20, the influent stream 26, the effluent treated water 30, and the treated effluent stream 38 can be measured and monitored, either continuously or periodically, using an in-line probe, capillary electrophoresis analyzer (lab on a chip), ion chromatograph, or other suitable analytical equipment.

By way of further example, oxygen analyzers 52, 53 and nitrate analyzers 54, 55 can be used to measure the dissolved oxygen and nitrate in the raw drinking water 20 and effluent treated water 30. Pressure sensors 56, 57, 58 may be used to gather pressure data at various points in the system. Turbidity sensors 59, 60 may be used to measure turbidity of the effluent treated water 30 and treated effluent stream 38.

The gathered data can be transmitted to the program logic control system 50. The program logic control system 50 can then use the received data to control various aspects of the system 10, allowing for a fully automated biological treatment process. For example, during operation, data received by the program logic controller 50 can be used to control dosing at the various stages of the system 10, allowing for the dosing amounts to be modified automatically in view of the actual, measured conditions within the system 10.

Program logic control system 50 can be configured, programmed, or adapted or otherwise used to control the dosing of nutrients 22 and other additives to the influent raw drinking water 20. For example, program logic control system 50 can be programmed to calculate a target amount of nutrients 22, oxygen 32, particle conditioning agents 34, and/or other dosing additives based on measured data concerning the influent raw drinking water 20, such as the flow rate, as well as the concentration of the stock solution of the various dosing additives. These target values can be set based on empirical data gathered during the start-up of the system 10 and predictive modelling of how the system 10 should behave. The program logic control system 50 can then send a control signal to the dosing units 70, 72 associated with each additive to deliver the appropriate dose. By way of further explanation, the appropriate concentration of nutrients 22 can be calculated by program logic control system 50 as a function of the dissolved oxygen and nitrate concentrations in the raw drinking water 20. Data received from the oxygen analyzers 52, 53 and/or nitrate analyzers 54, 55 can be correlated with other information, such as the flow rate and/or stock solution concentration, to determine the dosing amount and a control signal can be sent to nutrient 22 dosing unit 70 or feed pump to dose at the calculated concentration. The program logic control system 50 can also be programmed with a range of dissolved oxygen and nitrate concentrations that are desired for the effluent treated water 30, and when the measured values (as gathered by in-line sensors) are determined to be outside of these ranges, the program logic control system 50 can adjust the dosing of nutrients 22 to correct the concentrations. This feed-forward, feed-backward nutrient 22 dose control ensures that sufficient nutrients 22 are dosed while minimizing excess nutrients in the effluent treated water 30 of the anoxic-anaerobic bioreactor 12.

By way of another example, pressure and turbidity data gathered by pressure sensors 56, 57, 58 and/or turbidity sensors 59, 60 can be transmitted to the program logic control system 50 for calculating biomass conditions at each stage 12, 14 to assess the slime growth, sloughing matter, clogging and the like that is detrimental to efficient system 10 operation. Based on the measured data, the program logic control system 50 can then adjust the dosing of, e.g., hydrogen peroxide 24 by control of a hydrogen peroxide dosing unit 72 in water flows 26, 30, and/or control backwash pump 40 and air blower 18 to chemically scour and physical loosen and remove biomass accumulation in the system 10. The measured data may also be used to control and adjust dosing of the particle conditioning agent 34 by a particle conditioning dosing unit 74 and of the liquid oxygen 32 by an oxygen dosing unit 76. Further specifics of exemplary feed-forward, feed-backward control loops that can be implement in the system 10 follow.

A feed-forward, feed-backward control loop implemented by program logic control system 50 can be used to determine nutrient 22 dosing of the raw drinking water 20. In one embodiment, dosing of an electron donor feed chemical, such as acetic acid, can be controlled using a feed-forward, feed-backward control loop implemented by the program logic control system 50. The dose of the electron donor feed chemical can be determined based on the following general formula:

$$\text{Dose in mg/L} = \{ED1\} + \{ED2\}$$

where $\{ED1\}$ represents the dose determined from the feed-forward portion of the control loop and $\{ED2\}$ represents the dose determined from the feed-backward portion of the control loop.

The feed-forward dose $\{ED1\}$ can be a function of the concentrations of dissolved oxygen and nitrate in the raw drinking water 20. Data on the dissolved oxygen and nitrate concentrations can be measured during startup using in-line sensors, and these measurements may be continuously or periodically repeated during operation to provide updated data to the program logic control system 50. The feed-forward dose $\{ED1\}$ can then be determined using this data according to one or more equations programmed into program logic control system 50. These equations can be derived a number of different ways, including by half reaction techniques, or through the analysis of empirical data. By way of example, one or more of the following formulas may be useful in determining the feed-forward portion of the dose of acetic acid {AA1}:

$$\{AA1\} = C_1 * O_2 + C_2 * NO_3 \text{ (half reaction based)}$$

$$\{AA1\} = C_3 * (C_4 * O_2 + C_5 * NO_3) \text{ (empirical based)}$$

wherein {AA1} is the acetic acid dose in mg/L as $CH_3COOH$, $O_2$ is the measured dissolved oxygen in the raw drinking water in mg/L, $NO_3$ is the measured nitrate concentration in the raw drinking water in mg/L as $NO_3$, and $C_1$ through $C_5$ are derived constants. In one embodiment, $C_1$=1.54, $C_2$=0.99, $C_3$=1.7, $C_4$=0.38, and $C_5$=0.24. For electron donor feed chemicals other than acetic acid, a similar control strategy can be used with different control equations that are based on an electron donor equivalency to acetic acid.

The feed-backward dose value {ED2} can be determined by program logic control system 50 using data collected through downstream sampling and can have the effect of either increasing or decreasing the overall dosing of electron donor feed chemical to the influent raw drinking water 20. By way of example, the feed-backward dose {ED2} can be determined by monitoring the nitrogen concentration (as $NO_2$ and/or $NO_3$) in the interstage effluent treated water 30 using the sensors discussed herein and then comparing, at the program logic control system 50, the measured value(s) to a target or set point nitrogen concentration. Deviations between the measured value and the target value can then be factored into the calculation of {ED2}. Thus, the dosing of the influent raw drinking water 20 is a function of the downstream performance of the system 10. By way of another example, feed-backward dose {ED2} can be determined by monitoring the perchlorate concentration in the effluent treated water 30 and/or treated effluent stream 38 using the sensors discussed herein and then comparing, at the program logic control system 50, the measured value(s) to a target or set point value. Deviations between the measured perchlorate concentration and the setpoint can be factored into a determination of the appropriate dosing of the electron donor feed chemical in the influent raw drinking water 20.

Once the electron donor feed chemical dose is determined, program logic control system 50 can send a control signal to nutrient dosing unit 70 to dispense the appropriate dose of electron donor feed chemical. Throughout operation, the dosing signal can be modified as additional gathered data is received and analyzed by the program logic control system 50. Dosing of other nutrients 22 can be controlled by program logic control system 50 as well. For example, the dosing of phosphorus, such as in the form of phosphoric acid, to the influent raw drinking water 20 can be determined as a function of the electron donor feed chemical according to the following formula:

$$\text{Phosphoric acid dose (in mg/L as P)} = C_6 * \{ED\}$$

where $C_6$ is a derived constant and {ED} is the dose of electron donor feed chemical in mg/L. When {ED} is acetic acid, it has been found that a preferred value of $C_6$ is 0.011.

Also useful is the control of dissolved oxygen in the treated effluent stream 38, which can be accomplished by adjusting the dosing of oxygen 32 in the effluent treated water 30 through a feedback control mechanism. For example, an oxygen analyzer can be used to monitor the dissolved oxygen concentration in the treated effluent stream 38. This measured value can be provided to the program logic control system 50 where it can be used to determine the dosing of oxygen 32 to the effluent treated water 30 according to the following formula:

$$\text{Oxygen (in mg/L)} = C_7 * \{DO_{target}\}$$

where $C_7$ is a derived constant and $\{DO_{target}\}$ is the target setpoint of the dissolved oxygen concentration in mg/L in the treated effluent stream 38. When the oxygen 32 is supplied in the form of $H_2O_2$, it has been found that a preferred initial value of $C_7$ is 2.5, though this can be adjusted. A feed-backward control mechanism can then be used to adjust the supply of oxygen 32 based on the measured value of the dissolved oxygen concentration in the treated effluent stream 38. If, for example, the measured value of dissolved oxygen in the treated effluent stream 38 is not within an acceptable deviation from the target DO setpoint over a proscribed period of time, the dose of oxygen 32 supplied to the effluent treated water 30 can be adjusted. Minimum and maximum oxygen doses can also be set by an operator.

Program logic control system 50 can also be configured or programmed to manage headloss across each bioreactor 12, 14. Management of headloss can be accomplished in a variety of different ways, and generally involves measuring the headloss across the media bed and underdrain of the bioreactor 12 or biofilter 14 over time. The headloss can be determined by measuring, using pressure sensors, the difference in pressure across the bioreactor 12 or biofilter 14. If the rate of headloss exceeds a predetermined rate, the operator can be notified and one or more headloss correction techniques can be initiated manually or automatically.

One exemplary headloss correction technique involves increasing the hydrogen peroxide dosing to the backwash stream to scour the system of biomass, provided the increase does not exceed the maximum allowed absolute dose. Another headloss correction technique involves initiating an underdrain oxygen soak step as part of the backwash procedure. Yet another headloss correction techniques involves reducing the amount of time between backwashes. Another headloss correction technique involves changing the air scour time and/or intensity during the backwash process. Yet another headloss correction technique involves dosing the influent raw drinking water 20 with hydrogen peroxide to scour the system of biomass.

Dosing of a disinfection agent, such as chlorine, to the treated effluent stream 38 can also be controlled by the program logic control system 50 using a feed-forward, feed-backward control mechanism. For example, the feed rate of the disinfection agent can be set and/or adjusted based on a measured system flow rate at a point upstream of the disinfection agent dosing point, such as the effluent treated water 38 flow rate. The residual amount of disinfection agent can also be measured at a point downstream of the dose point and compared to a residual setpoint. Dosing can then be adjusted upward or downward to account for differences between the measured residual value and the setpoint value. Changes to the dosing amount can be tracked over time and, if the required dose as determined based on the measured residual amount exceeds a predetermined value, the operator can be notified about potential nitrite production/accumulation within the system 10.

As mentioned above, the bioreactor effluent treated water 30 may be dosed with a particle conditioning agent 34, such as a coagulant or a polymeric compound, in the interstage flow between the bioreactor 12 and the aerobic biofilter 14 to control biomass sloughing. A dosing amount of the particle conditioning agent 34 can be determined and controlled by program logic control system 50 based on measured turbidity values. For example, the turbidity of the effluent treated water 38 can be monitored using a turbidity sensor and the value can be reported to the program logic control system 50 where it is compared to a predetermined setpoint. If the measured turbidity differs from the setpoint by more than a certain amount, the program logic control system 50 can increase or decrease the dosing of the particle conditioning agent 34 accordingly.

Exemplary Embodiments

In one preferred and non-limiting embodiment, and as discussed, the fixed-bed (FXB) biological process according to the present invention represents two-stage conventional granular media filtration with additional chemical feed points. In this embodiment, acetic acid and phosphoric acid are dosed to the raw water, which then passes through a fixed-bed bioreactor, and the bioreactor includes a steel pressure vessel containing approximately 5 feet of granular activated carbon (GAC). The pressure vessel can be various dimensions, and the GAC is colonized by organisms indigenous to the raw water. Bacteria across the bioreactor reduce dissolved oxygen (DO), nitrate, and perchlorate to water, nitrogen gas, and chloride, respectively. Acetic acid is oxidized to carbon dioxide. Effluent from the bioreactor is dosed with cationic polymer (to improve filterability of the sloughed cells) and hydrogen peroxide (which reoxygenates the water and provides some oxidizing power to eliminate acetic acid or hydrogen sulfide if either of these compounds breakthrough). A degas step may be included upstream of the polymer and peroxide if nitrogen gas bubbles cause hydraulic or turbidity challenges in the second stage bioreactor. Degas could be achieved by using an open basin, open channel cascading flow, or a mechanical gas separator. If head is broken for the degas step, an interstage pump could be used. After polymer and peroxide are dosed, water passes through a second FXB bioreactor (steel pressure vessel), which acts as an aerobic biofilter (to remove turbidity, and biologically oxidize any residual acetic acid and hydrogen sulfide). Biofilter effluent is then disinfected and is ready for storage or distribution.

In one preferred and non-limiting embodiment, and with respect to the in-line monitoring process, some or all of the following parameters are measured continuously using in-line sensors and analytical equipment: flow rate; bioreactor head loss; run time; dissolved oxygen concentration (including raw water and biofilter effluent), such as by using an in-line probe; nitrate concentration (including raw water and bioreactor effluent), such as by using an in-line probe or a capillary electrophoresis analyzer; perchlorate concentration (bioreactor effluent), such as by using a capillary electrophoresis analyzer or an ion chromatograph; and/or turbidity (including bioreactor effluent and biofilter effluent); and chlorine concentration (downstream of chlorine addition point).

In one preferred and non-limiting embodiment, the FXB biological treatment process is fully automated, and the programmed logic controller (PLC) is configured or programmed to deliver a target chemical dose based on flow rate and stock solution concentration. The target dose for polymer, peroxide, and chlorine are fixed, and are based on empirical data gathered during start-up. Dose set points can be adjusted up or down automatically if turbidity values or dissolved oxygen concentrations in the biofilter effluent are outside a set range. In this embodiment, acetic and phosphoric acid chemical feed rates are also a function of target dose and stock solution concentration. In this case however, the target dose fluctuates as a function of raw water DO and nitrate concentration. The PLC calculates a target acetic and phosphoric acid dose using an empirical formula and data from the in-line nitrate and DO analyzers. The PLC will also adjust the acetic and phosphoric acid dose, as necessary, if the nitrate or perchlorate concentration in the bioreactor effluent fall outside a set range.

In one preferred and non-limiting embodiment, process times for the FXB bioreactor will be approximately 24 hours, and process times for the aerobic biofilter will be approximately 48 hours. These process times may be adjusted slightly up or down based on start-up performance. Further, backwashes will initiate automatically based on time, and will include an air scour step, a combined air scour/fluidization step, and a final fluidization step, and no filter to waste period is anticipated. A bioreactor/biofilter is expected to be off line for approximately 30 minutes during a backwash procedure. Redundancy can be considered to maintain continuous service during backwash and maintenance periods as necessary.

Figure 2:
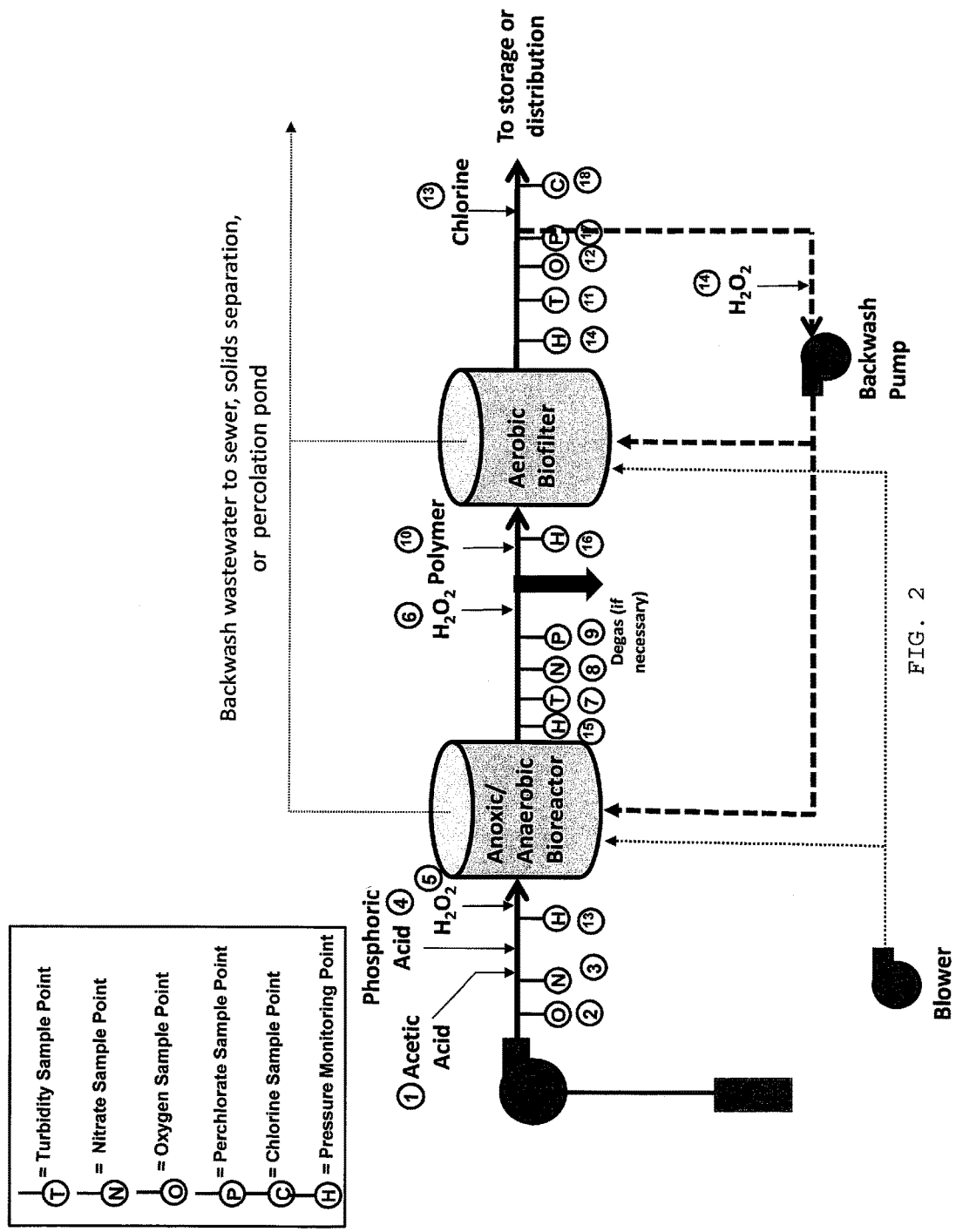
FIG. 2 is a schematic flow diagram of an embodiment of another embodiment of biological two-stage contaminated water treatment system and process according to the principles of the present invention.

One preferred and non-limiting embodiment (as illustrated in FIG. 2) includes control loops or processes as follows:

Acetic Acid Control

1. Use of a combination feed forward and feed back to determine dose:

$$(1) \text{ in mg/L } CH_3COOH = \{AA1\} + \{AA2\}$$

Feed Forward

1. Feed water electron donor dose (i.e., acetic acid dose (1)) is controlled by feed water dissolved oxygen concentration (2) and feed water nitrate concentration (3):

$$AA \text{ dose } \{AA1\} \text{ (in mg/L as } CH_3COOH) = 1.54 * O_2 \text{ (2) (in mg/L)} + 0.99 * NO_3 \text{ (3) (in mg/L as } NO_3)$$
(half reaction based)

$$AA \text{ dose } \{AA1\} \text{ (in mg/L as } CH_3COOH) = 1.7 * (0.38 * O_2 \text{ (2) (in mg/L)} + 0.24 * NO_3 \text{ (3) (in mg/L as } NO_3))$$ (empirically based)

For electron donor feed chemicals, other than acetic acid, similar control strategy can be implemented with different control equations based on an electron donor equivalency to acetic acid.

Feed Backward

1. Feed water electron donor dose is trimmed $\{AA2\}$ by stage 1 effluent nitrogen concentration (no. 2 and no. 3) compared to stage 1 effluent nitrogen concentration setpoint $\{S1\}$.

2. Optional control and monitoring of stage 1 (9) and/or stage 2 (17) effluent perchlorate concentration, such as through laboratory analysis or an automated analytical system.

Orthophosphate Control

Feed Forward

1. Feed water orthophosphate dose (i.e., phosphoric acid dose (4)) is controlled by feed water electron donor (acetic acid) dose (1):

$$\text{Phosphoric acid dose (4) (in mg/L as P)} = 0.011 * \text{acetic acid dosed (1) (mg/L as } CH_3COOH)$$

Effluent Dissolved Oxygen (DO) Control

1. Biofilter effluent DO control includes monitoring DO at (12).

2. Dose hydrogen peroxide in mg/L (6) based on the following formula:

$$H_2O_2 \text{ in mg/L (6)} = \text{Target set point DO concentration in mg/L (12)} * \text{(adjustable parameter, initially 2.5)}$$

Feed Backward

1. If (12) is not within an acceptable deviation from target oxygen set point for an operator adjustable period of time, modify hydrogen peroxide dose at (6) by an operator set adjustment amount in mg/L, where the minimum and maximum hydrogen peroxide doses to be operator set in mg/L.

Bioreactor Headloss Management

1. Hydrogen peroxide dose (14) to bioreactor backwash initially set at operator set point in mg/L.

Feed Backward

1. Monitor headloss across bioreactor media bed and underdrain ((13), (14), and (15)) over time. If rate of headloss increase exceeds operator entered rate over operator entered time period, initiate at least one of the following operator selectable options and notify operator: (a) increase backwash hydrogen peroxide dose (14) by operator entered amount in mg/L up to a maximum allowed absolute dose; (b) initiate underdrain hydrogen peroxide soak step as part of backwash procedure dosing at (14); (c) reduce run time set point between backwashes by operator entered amount; (d) change air scour time and/or intensity during backwash; and/or (e) dose hydrogen peroxide at (5) at operator entered dose in mg/L.

Chlorine Dosing and Demand Monitoring

1. Chlorine is dosed for residual disinfection at (13) to meet a target residual at (18).

Feed Forward

1. Modify chlorine feed rate at (13) based on system flow rate.

Feed Backward

1. Dose chlorine at (13) based on residual measured at (18) to meet operator entered chlorine residual set point, and increase dose to be within set deviation of set point.

2. Monitor chlorine residual at (18), tracking dose (13) versus residual (18) over time. If required dose (13) changes more than operator entered value to meet a target residual (18), and notify operator and/or activate alarm indicating potential nitrite production/accumulation.

Biomass Sloughing Control System

1. Filter aid polymer is dosed at (10) to control biomass sloughing through removal in biofilter.

Feed Backward

1. Monitor turbidity (11). If turbidity exceeds operator entered value, increase or decrease polymer dose at (10) by operator entered value, and notify operator.

As illustrated in FIG. 2, and as discussed above (and in one preferred and non-limiting embodiment), various specified sample points are provided for use in controlling and executing the method and process, including, but not limited to: turbidity sample points (7) and (11); nitrate sample points (3) and (8); oxygen sample points (2) and (12); perchlorate sample points (9) and (17); chlorine sample points (18), and pressure monitoring points (13), (14), (15), and (16). In particular, and in this preferred and non-limiting embodiment, the level or data sensed or sampled at these sample points may be used in dosing, determining, calculating, adding, or injecting one or more of the following compounds: acetic acid (1), phosphoric acid (4), H2O2 (5), (6), and (14) polymer (10), and/or chlorine (13). Further, and in another preferred and non-limiting embodiment, and as discussed above, the process control methodology described above may be used in controlling and effecting the water treatment system illustrated in FIG. 1.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for treatment of water that contains contaminants comprising:
    dosing an influent water stream containing at least one of a nitrate, perchlorate, chromate, selenate, and a volatile organic chemical with a dosing amount of one or more nutrients;
    after dosing the influent water stream with the one or more nutrients, processing the influent water stream in an anoxic-anaerobic bioreactor;
    dosing an effluent treated water stream of the anoxic-anaerobic bioreactor with a dosing amount of a particle conditioning agent;
    oxygenating the effluent treated water stream of the anoxic-anaerobic bioreactor; and
    after dosing the effluent treated water stream with the particle conditioning agent and oxygenating the effluent treated water stream, filtering the effluent treated water stream in an aerobic biofilter to produce a treated effluent stream,
    monitoring, using one or more sensors, at least a measured dissolved oxygen content in the influent water stream, a measured dissolved oxygen content in the treated effluent stream, a measured nitrate content in the influent water stream, and a measured turbidity value in the effluent treated water stream,
    wherein the dosing amount of the of one or more nutrients, the dosing amount of the particle conditioning agent, and the oxygenating of the effluent treated water stream are periodically adjusted by a program logic controller based upon data received from the one or more sensors,
    wherein the dosing amount of the one or more nutrients is adjusted by the program logic controller based at least in part upon the measured dissolved oxygen content in the influent water stream and the measured nitrate content in the influent water stream,
    wherein the dosing amount of the particle conditioning agent is adjusted by the program logic controller based at least in part upon the measured turbidity value in the effluent treated water stream, and
    wherein the oxygenating of the effluent treated water stream is adjusted by the program logic controller based at least in part on the measured dissolved oxygen concentration in the treated effluent stream.

2. The method of claim 1, further comprising monitoring, using one or more sensors, at least a measured nitrogen concentration in the effluent treated water stream, wherein the dosing amount of the one or more nutrients is adjusted by the program logic controller based additionally, at least in part, on the measured nitrogen concentration in the effluent treated water stream.

3. The method of claim 2, wherein the program logic controller is configured or programmed to compare the measured nitrogen concentration to a target nitrogen concentration in the effluent treated water stream.

4. The method of claim 2, further comprising monitoring, using one or more sensors, at least a measured perchlorate concentration in the effluent treated water stream, wherein the adjustment to the dosing amount of the one or more nutrients is based additionally, at least in part, on the measured perchlorate concentration in the effluent treated water stream.

5. The method of claim 1, wherein said nutrients are at least one of the following: organic carbon based electron donors, phosphorus, nitrogen, or any combination thereof.

6. The method of claim 5, wherein said nutrients are at least one of the following: acetic acid, phosphoric acid, liquid ammonium sulfate, or any combination thereof.

7. The method of claim 1, further comprising dosing each of said influent water stream and said effluent treated water stream with a respective dosing amount of hydrogen peroxide to control biomass content.

8. The method of claim 7, wherein the dosing amount of hydrogen peroxide in the influent water stream and the dosing amount of hydrogen peroxide in the effluent treated water stream are periodically adjusted by the program logic controller.

9. The method of claim 8, wherein oxygenating the effluent treated water stream comprises dosing the effluent treated water stream with the dosing amount of hydrogen peroxide in the effluent treated water stream.

10. The method of claim 9, wherein the program logic controller is configured or programmed to compare the measured dissolved oxygen concentration in the treated effluent stream to a target dissolved oxygen concentration in the treated effluent stream.

11. The method of claim 1, further comprising monitoring, using one or more sensors, at least a measured turbidity value in the treated effluent stream, wherein the dosing amount of the particle conditioning agent is adjusted by the program logic controller based additionally, at least in part, on the measured turbidity value in the treated effluent stream.

12. The method of claim 11, wherein the program logic controller is configured or programmed to compare the measured turbidity value in the treated effluent stream to a target turbidity value in the treated effluent stream.

13. The method of claim 1, further comprising measuring a pressure change and turbidity in the anoxic-anaerobic bioreactor and in the aerobic biofilter, and controlling operation of a backwash pump to pump a fluid from a backwash tank to flow through the anoxic-anaerobic bioreactor and the aerobic biofilter to control biomass content based on the measured pressure change and turbidity.

14. The method of claim 1, wherein the method is performed in a two-stage system consisting of two reactors, wherein a first reactor is the anoxic-anaerobic bioreactor and a second reactor is the aerobic biofilter.

15. A system for treatment of water that contains contaminants comprising:
an anoxic-anaerobic bioreactor in fluid communication with, by way of an influent water conduit, an influent water source containing at least one of a nitrate, perchlorate, chromate, selenate, and a volatile organic chemical;
a nutrient dosing unit in fluid communication with said influent water conduit, wherein said nutrient dosing unit is controlled by a program logic controller;
a particle conditioning dosing unit in fluid communication with an effluent treated water conduit containing effluent treated water of the anoxic-anaerobic bioreactor connected between said anoxic-anaerobic bioreactor and an aerobic biofilter, wherein said particle conditioning dosing unit is controlled by said program logic controller;
an oxygenation unit in communication with the effluent treated water conduit and adapted to oxygenate the effluent treated water between the anoxic-anaerobic bioreactor and the aerobic biofilter, wherein the oxygenation unit is controlled by the program logic controller;
a treated effluent conduit containing treated effluent output of said aerobic biofilter;
a plurality of in-line sensors positioned to collect data related to the influent water source, effluent treated water, and treated effluent output, the sensors in electronic communication with the program logic controller, including at least a first oxygen analyzer connected to the influent water conduit, a second oxygen analyzer connected to the treated effluent conduit, a first nitrate analyzer connected to the influent water conduit, and a first turbidity sensor connected to the effluent treated water conduit,
wherein the program logic controller is programmed to control the nutrient dosing unit and particle conditioning dosing unit based at least partially upon data received from the in-line sensors,
wherein the dosing amount of the one or more nutrients is adjusted by the program logic controller based at least in part upon data received from the first oxygen analyzer and the first nitrate analyzer,
wherein the dosing amount of the particle conditioning agent is adjusted by the program logic controller based at least in part upon data received from the first turbidity sensor, and
wherein the oxygenation unit is adjusted by the program logic controller based at least in part on data received from the second oxygen analyzer.

16. The system of claim 15, wherein the sensors further comprise:
a third oxygen analyzer connected to said effluent treated water conduit;
a second nitrate analyzer connected to said effluent treated water conduit;
a first pressure sensor transducer connected to said influent water conduit, a second pressure sensor transducer connected to said effluent treated water conduit, and a third pressure sensor transducer connected to said treated effluent conduit; and
a second turbidity sensor connected to said treated effluent conduit.

17. The system of claim 15, wherein the system is a two-stage system consisting of two reactors, wherein a first reactor is the anoxic-anaerobic bioreactor and a second reactor is the aerobic biofilter.

* * * * *